Sept. 12, 1933.   T. STENHOUSE   1,926,122
PNEUMATIC GLASS FEEDER
Filed April 16, 1930

Inventor
Thomas Stenhouse
By
Eccleston + Eccleston
Attorneys

Patented Sept. 12, 1933

1,926,122

UNITED STATES PATENT OFFICE 1,926,122

PNEUMATIC GLASS FEEDER

Thomas Stenhouse, Washington, Pa., assignor to Hazel-Atlas Glass Co., Wheeling, W. Va., a corporation of West Virginia Application April 16, 1930. Serial No. 444,808

37 Claim. (Cl. 49—55)

The invention relates generally to that type of feeder in which glass charges are formed by periodically increasing and decreasing the pressure of air on the body of glass. Feeders of the pressure and vacuum type are old and well known; and have been very successful in commercial operation. However, such feeders must be operated with care; for otherwise it is possible that the body of glass may gradually rise, due to a building up of vacuum, or may gradually fall, due to a building up of pressure.

In accordance with the present invention, means is provided to prevent the glass from rising above a predetermined level, or from falling below a predetermined level. That is, the degree of vacuum may be increased or decreased, or the duration of the application of the vacuum may be increased or decreased, or the viscosity of the glass may increase or decrease, yet the glass will not be raised above a certain predetermined level, by reason of mechanism which is controlled by the level of the glass. Likewise, the pressure on the glass may be increased or decreased, and the duration of the application of pressure may be increased or decreased, and the viscosity of the glass may be increased or decreased, without the glass being lowered below a certain predetermined level. In other words, in the present invention, the rise of the glass to a certain level will automatically cause the application of vacuum to cease; and the fall of the glass to a certain level will cause the application of pressure to cease; the controlling means being operated by the level of the glass.

While in accordance with this invention the glass is automatically prevented from rising above a certain level, or falling below a certain level, yet the invention also provides for varying the level to which the glass may rise or fall, for varying the period during which the vacuum is applied, the period during which the pressure is applied, etc.

Figure 1:
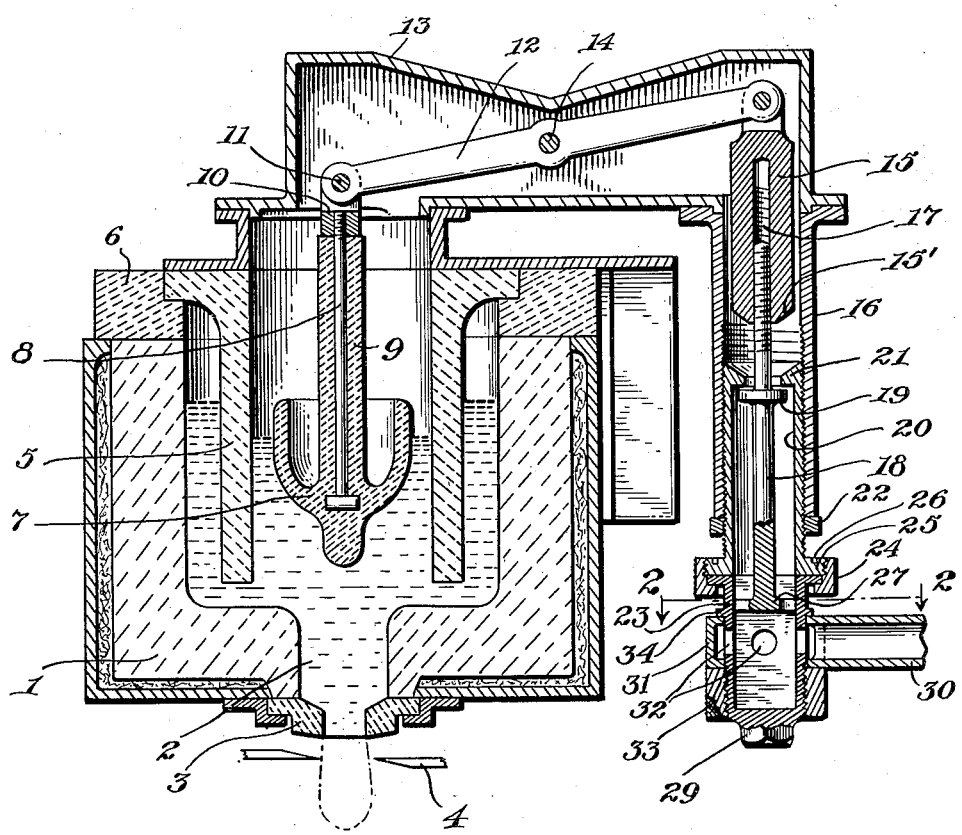
Figure 2:
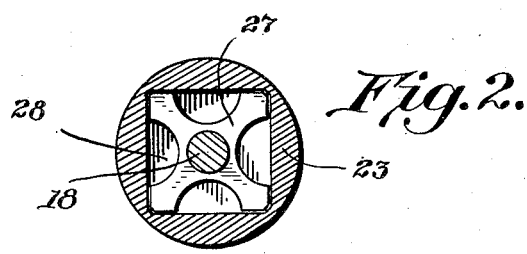

The numerous advantages of the invention will be apparent to those skilled in the art, from the following detailed description, taken in connection with the accompanying drawing; in which Figure 1 is a vertical sectional view of the feeder; the shears being shown diagrammatically; and Figure 2 is a detail horizontal sectional view taken on line 2—2 of Figure 1.

Referring to the drawing more in detail, numeral 1 indicates a conventional flow spout having a flow orifice 2 provided with a removable bushing 3. Conventional shears, diagrammatically illustrated and referred to by numeral 4, are arranged below the flow orifice for severing the formed charges, which then drop into molds, in the usual manner.

Mounted in the flow spout, in alignment with the flow orifice, is the usual pressure and vacuum tube 5, supported by the cover 6 of the flow spout, and which projects downwardly into the glass to a point adjacent the floor of the flow spout. The glass normally rises in this tube to the level of the glass in the flow spout and tank. The flow spout may also be provided with the ordinary vertically adjustable gate of refractory material (not shown), for controlling or entirely shutting off the flow of glass.

All of the structure thus far described is old and well known in the glass art. Also, it is common practice to subject the glass in the tube to alternate pressure and vacuum, for the purpose of forming the charges. As mentioned hereinbefore, such prior feeders require considerable care and attention, particularly so for the reason that no means was employed for positively determining the level to which the glass may rise or fall in the pressure and vacuum tube. The present invention, which will now be described, includes among other novel features, that of automatically controlling by the glass itself, the level to which it can rise or fall, entirely independently of the temperature and viscosity of the glass, or the intensity or duration of the pressure and vacuum; and varying those levels to suit conditions.

Numeral 7 refers to a float of refractory material, which is adapted to float on the glass in the tube 5, and rise and fall with the glass. The lower portion of the float may be of any desired shape, such as an ordinary disc, or it may have a ball shape, etc.; the only essential being that it be so shaped as to rise and fall with the glass. In the form illustrated herein the float is of a general cup shape.

The float may be suspended in any desired manner. In the present form a metal rod 8 has its lower end embodied in the body of the float, and the rod is protected by the refractory shank 9 which extends upwardly from the float proper. The upper end of the rod is threaded into a bracket 10 which is pivotally mounted on a pin 11, carried by a lever 12.

A metallic casing or housing 13 has one end communicating with the interior of the pressure and vacuum tube; the casing and tube having a sealed connection. The lever 12, from which the float 7 is suspended, is mounted in this casing 13;

the lever being fulcrumed at 14, which may be any point intermediate its ends.

Pivotally suspended from the opposite end of the lever 12 is counterbalance 15, which in the specific form illustrated herein, projects downwardly into a tubular extension 16 of the casing or housing 13. The casing or housing and the extension are connected together with an airtight joint, and for all practical purposes these two parts may be considered as a single housing communicating with the pressure and vacuum tube 5 and having an airtight connection therewith.

It will be noted that the counterweight 15 is of considerably smaller diameter than the interior of the tubular casing 16, thereby providing ample space between the counterweight and casing, for the free passage of air. The lower portion 15' of the counterweight, is tapered and functions as a valve. The counterweight is provided with a central bore 17 which is threaded, and the upper end of a valve stem 18, carrying a valve 19, is screwed therein. This provides an adjustable connection between these two valves, permitting the distance between them to be increased or decreased, as desired.

The tubular casing 16 is interiorly threaded, and receives an exteriorly threaded cylindrical member 20, which carries a double valve seat 21. By rotating the cylindrical member the double valve seat is raised or lowered to the desired extent. The upper face of the valve seat is adapted to cooperate with the valve 15', while the lower face of the valve seat is adapted to cooperate with the valve 19. Of course, the cylindrical member 20 has an airtight connection with the casing 16, and a lock nut 22 is preferably employed, for the purpose of maintaining the cylindrical member and its valve seat in adjusted position.

Coupled to the lower end of the cylindrical member 20, in airtight relation, is an air inlet member 23 which has a cylindrical exterior and a squared interior. This air inlet member is clamped to element 20 by means of a clamping coupling 24 which has a flange engaging under a cooperating flange on the inlet member, and which is threaded onto a flange 25 formed on the lower end of the element 20. When it is desired to adjust the double valve seat 21 it is only necessary to loosen the clamping coupling 24, and then rotate the cylindrical member 20 in the desired direction, by applying a spanner wrench to the notches 26 or by any other desired means.

As stated above, the interior of the air inlet member 23 is squared, and it loosely receives the enlarged squared head 27 formed on the lower end of the valve stem 18; the free passage of air past the head being permitted by the openings 28 formed therein. Formed on the bottom of the air inlet member 23, is a projection 29 in the form of a nut. Of course, the invention is in no manner limited to this specific arrangement, but it has been described in some detail as it provides a simple construction for adjusting the extent of travel of the valves 15' and 19. Thus by applying a tool to the squared projection 29 the air inlet member 23 may be rotated in either direction, and the squared interior walls of the member cooperating with the squared head 27 of the valve stem, causes the stem to be rotated, thereby screwing the stem into or out of the counterweight 15, and thus increasing or decreasing the distance between the valves 15' and 19.

Numeral 30 refers to a pipe leading from sources of pressure and vacuum, not shown. It will be understood, of course, that an ordinary distributor controls the alternate application of pressure and vacuum through this pipe 30. It is unnecessary to illustrate the distributor, as they have been known for many years, and per se form no part of the present invention. The pipe 30 is formed with a drum 31 which embraces the air inlet member in sealing relation, and communicates with the interior thereof by means of ports 32. The pipe and drum are maintained in position by means of a knurled nut 33 which is threaded on the lower end of the air inlet member, and which clamps the drum against a flange 34 formed on the air inlet member.

The operation of the feeder will now be briefly descriwed.

The distributor will, as in the usual practice, admit air under pressure to the pipe 30, at the proper instant. This air under pressure will flow freely through the casing, into the upper end of the pressure and vacuum tube 5, where it will exert its force on the glass therein. This pressure acting on the glass in the tube will force the glass downward, thereby accelerating the flow of glass through the flow orifice 2. The extent to which the level of glass is lowered in the tube will depend upon the pressure of the air admitted to the tube, the length of time the glass is subjected to the pressure, and the temperature and viscosity of the glass.

Heretofore it has been impossible to automatically fix the level to which the glass in the tube is permitted to fall. In the present feeder, however, as soon as the glass has fallen to a predetermined level, or in other words, when the desired amount of glass has passed through the bushing 3, the pressure will be automatically shut off. This highly desirable function is accomplished by the float 7 which floats downwardly with the glass, and its downward movement elevates the valve stem and its valve 19. When the float has descended to the desired point the valve will close against its seat 21, thereby preventing the further admission of air under pressure to the tube 5. In Figure 1, the glass level has fallen to just about the desired level, and the valve 19 is almost in the act of seating.

By adjusting the valve seat 21 up or down, in the manner hereinbefore described, the level to which the glass is permitted to descend, is easily varied. Or, the level to which the glass is permitted to descend may be maintained, and the extent of rise and fall of the glass be varied by adjusting the valves 15' and 19 toward or from each other, as also described hereinbefore. Or, by adjusting both the valve seat and the valves, any desired intermediate action may be obtained.

At the proper instant the distributor will, in the usual manner, cause suction to be applied to the pipe 30, as by a vacuum pump, vacuum tank, etc. The air will thus be withdrawn from the tube 5, and the glass will rise therein. As stated above, in prior feeders there has been no way of automatically determining the extent to which the glass falls in the tube; and likewise it was impossible in prior feeders to automatically determine the extent to which the glass would rise under vacuum. In the present feeder the glass cannot rise above a predetermined level no matter how high the degree of vacuum may be, how long it is applied, or what the temperature and viscosity of the glass may be. For as soon as the glass level rises to a predetermined level, the float, which rises with the glass, will cause the valve 15' to engage the valve seat 21 and thus shut off communication between the tube 5 and the source of vacuum.

Any variations in the temperature and viscosity of the glass, are automatically taken care of in the present feeder, for if the temperature and viscosity changes so that the weight of the charge would ordinarily be reduced, the pressure will automatically continue in action longer, thus obtaining the same weight of charge; and if the temperature and viscosity change so that ordinarily the charge would be overweight, the duration of the pressure will automatically be reduced accordingly. So that while the present invention has been described generally as automatically controlling the pressure and vacuum in accordance with the rise and fall of the glass, it will be understood that it is substantially the equivalent of automatically controlling the pressure and vacuum to maintain the desired weight of charges.

The level to which the glass is permitted to rise, may be varied as desired, by adjusting the valve seat 21 up or down. Or the level to which the glass is permitted to rise may be maintained, and the extent of rise and fall may be varied by adjusting the valves 15' and 19 toward or from each other. Any intermediate action may be obtained by adjusting both the valve seat and the valves.

The severing of the charges has not been described; it being understood that the charges, when formed, are severed in the usual manner.

The present invention greatly improves the control of pneumatic glass feeders, and as the rise and fall of the glass is automatically stopped at predetermined levels, it follows that the feeder does not require the care and attention which has heretofore been necessary; and the simple adjustments provide means for producing any desired effect.

The invention, and the particular construction illustrated, have been described in considerable detail, but it is to be understood that a wide variety of structures can be employed in place of that described herein; and the appended claims are intended to cover all such structures.

What I claim is:

1. A pneumatic glass feeder including a flow spout having a submerged flow orifice, means projecting into the glass above the orifice for forming charges of glass below the orifice, and means actuated by movement of the glass for automatically controlling the glass level, irrespective of the degree of plus or minus pressure applied to the glass 2. A pneumatic glass feeder including a flow spout having a submerged flow orifice, means projecting into the glass above the orifice for forming charges of glass below the orifice, and means actuated by movement of the glass for controlling the glass level.

3. A pneumatic glass feeder including a flow spout having in its bottom a flow orifice opening downward, means for causing the glass to rise and fall to form suspended charges below the orifice, and means actuated by movement of the glass for automatically stopping the glass from rising above a predetermined level, irrespective of the degree of minus pressure applied to the glass.

4. A pneumatic glass feeder including a flow spout having in its bottom a flow orifice opening downward, means for causing the glass to rise and fall to form suspended charges below the orifice, and means actuated by movement of the glass for automatically stopping the glass from falling below a predetermined level, irrespective of the plus pressure applied to the glass.

5. A pneumatic glass feeder including a flow spout having in its bottom a flow orifice opening downward, means for causing the glass to rise and fall to form suspended charges below the orifice, and means directly affected by the rise and fall to render inoperative the first-mentioned means.

6. A pneumatic glass feeder including a flow spout having in its bottom a flow orifice opening downward, means for causing the glass to rise and fall to form suspended charges below the orifice, and means floating upon the glass for rendering inoperative the first-mentioned means.

7. A pneumatic glass feeder including a flow spout having in its bottom a flow orifice opening downward, means causing alternate pressure and vacuum to act on the glass to form suspended charges below the orifice, and means controlled by the level of the glass for shutting off the pressure.

8. A pneumatic glass feeder including a flow spout having in its bottom a flow orifice opening downward, means causing alternate pressure and vacuum to act on the glass to form suspended charges below the orifice, and means controlled by the level of the glass for shutting off the vacuum.

9. A pneumatic glass feeder including a flow spout having in its bottom a flow orifice opening downward, means causing alternate pressure and vacuum to act on the glass to form suspended charges below the orifice, and means controlled by the level of the glass for shutting off the pressure and vacuum.

10. A pneumatic glass feeder including a flow spout having in its bottom a flow orifice opening downward, means for causing the glass to rise and fall to form suspended charges below the orifice, and means controlled by the rise and fall of the glass for fixing the limits of rise and fall.

11. A pneumatic glass feeder including a flow spout having in its bottom a flow orifice opening downward, means for causing the glass to rise and fall to form suspended charges below the orifice, means controlled by the rise and fall of the glass for fixing the limits of rise and fall, and means for varying one or both of the limits.

12. A pneumatic glass feeder including a flow spout having in its bottom a flow orifice opening downward, means for causing the glass to rise and fall to form suspended charges below the orifice, means controlled by the rise and fall of the glass for fixing the limits of rise and fall, and means for varying the extent of rise and fall.

13. A pneumatic glass feeder including a flow spout having in its bottom a flow orifice opening downward, means for subjecting the glass to a partial vacuum to aid in the formation of a suspended charge below the orifice, and means automatically controlling the duration of the vacuum in accordance with the level of the glass.

14. A pneumatic glass feeder including a flow spout having in its bottom a flow orifice opening downward, means for subjecting the glass to pressure above atmospheric pressure to aid in the formation of a suspended charge below the orifice, and means for automatically controlling the duration of the pressure in accordance with the level of the glass.

15. A pneumatic glass feeder including a flow spout having in its bottom a flow orifice opening downward, means for periodically applying pressure to the glass to aid in the formation of suspended charges below the orifice, a valve controlling the pressure supply, said valve adapted to be actuated by movement of the glass.

16. A pneumatic glass feeder including a flow spout having in its bottom a flow orifice opening downward, means for periodically applying pressure to the glass to aid in the formation of suspended charges below the orifice, a valve controlling the pressure supply, said valve being automatically closed when the glass falls to a predetermined level.

17. A pneumatic glass feeder including a flow spout having in its bottom a flow orifice opening downward, means for periodically subjecting the glass to a partial vacuum to aid in the formation of suspended charges below the orifice, a valve controlling the application of the vacuum, and said valve adapted to be actuated by movement of the glass.

18. A pneumatic glass feeder including a flow spout having in its bottom a flow orifice opening downward, means for periodically subjecting the glass to a partial vacuum to aid in the formation of suspended charges, a valve controlling the application of the vacuum, said valve being automatically closed when the glass rises to a predetermined level.

19. A pneumatic glass feeder including a flow spout having in its bottom a flow orifice opening downward, means for periodically applying pressure and vacuum to the glass to form suspended charges below the orifice, a valve controlling the application of the pressure and vacuum, said valve being controlled by the glass.

20. A pneumatic glass feeder including a flow spout having in its bottom a flow orifice opening downward, means for periodically applying pressure and vacuum to the glass to form suspended charges below the orifice, and a valve actuated by the glass for controlling the pressure and vacuum.

21. A pneumatic glass feeder including a flow spout having in its bottom a flow orifice opening downward, means for periodically varying the air pressure on the glass above the flow orifice to form suspended charges below the orifice, a float in contact with the glass, a lever from which the float is suspended, said lever being counterbalanced, a valve operated by the lever, and a valve seat, said valve adapted to seat when the glass rises to a predetermined level.

22. A pneumatic glass feeder including a flow spout having in its bottom a flow orifice opening downward, means for periodically varying the air pressure on the glass above the flow orifice to form suspended charges below the orifice, a float in contact with the glass, a lever from which the float is suspended, said lever being counterbalanced, a float operated by the lever, and a valve seat, said valve adapted to seat when the glass falls to a predetermined level.

23. A pneumatic glass feeder including a flow spout having in its bottom a flow orifice opening downward, means for periodically varying the air pressure on the glass above the flow orifice to form suspended charges below the orifice, a float in contact with the glass, two valves controlling the variation in pressure, said valves being operated by the rise and fall of said float.

24. The method of feeding suspended charges of molten glass from a body of molten glass in a flow spout having an opening in its bottom which comprises applying super-atmospheric pressure to the surface of the body of glass to lower its level and to accelerate its flow through the opening, and limiting a downward movement of the glass to a predetermined level by the movement of the glass itself.

25. The method of feeding suspended charges of molten glass from a body of molten glass in a flow spout having an opening in its bottom which comprises subjecting the body of glass to a sub-atmospheric pressure to raise the level of the glass and retard the flow thereof, and limiting an upward movement of the glass to a predetermined level by the movement of the glass itself.

26. The method of feeding suspended charges of molten glass from a body of molten glass in a flow spout having an opening in its bottom by alternate super-atmospheric and sub-atmospheric pressures applied to the surface of the body of glass and controlling the level of the glass by movement of the glass itself.

27. A pneumatic glass feeder including means for causing the glass to rise and fall, means controlled by the rise and fall of the glass for fixing the limits of rise and fall, and means for varying the limits of the rise and fall without varying the extent of the rise and fall.

28. A glass feeder including a flow spout having a flow orifice, a pressure and vaccum tube extending downwardly into the glass in the flow spout and in alignment with the flow orifice, means for applying pressure and vacuum to the interior of the tube to aid in the formation of charges below the orifice, a float carried by the glass in the tube, said float controlling the pressure and vacuum.

29. A glass feeder including a flow spout having a flow orifice, a pressure and vacuum tube extending downwardly into the glass in the flow spout and in alignment with the flow orifice, means for periodically increasing and decreasing the pressure on the glass in the tube to form charges below the orifice, a float resting on the glass in the tube, a valve controlling the variations in pressure, and an operative connection between the float and the valve.

30. A glass feeder including a flow spout having a flow orifice, a tube extending downwardly into the glass in the flow spout, means for periodically varying the air pressure in the tube to form charges below the orifice, an implement adapted to be operated in accordance with the rise and fall of the glass in the tube, a valve controlling the variations in pressure, and an operative connection between the implement and valve.

31. A glass feeder including a flow spout having a flow orifice, means for periodically varying the air pressure on the glass above the flow orifice, a float in contact with the glass, a lever from which the float is suspended, said lever being counterbalanced, a valve operated by the lever, a valve seat, said valve adapted to seat when the glass rises to a predetermined level, a housing in which all of said mechanism is arranged, said housing having an airtight connection with the flow spout.

32. A glass feeder including a flow spout having a flow orifice, means for periodically varying the air pressure on the glass above the flow orifice, a float in contact with the glass, a lever from which the float is suspended, two valves operated by the lever and controlling the variations in pressure, and means for varying the distance between the two valves.

33. A glass feeder including a flow spout having a flow orifice, means for periodically varying the air pressure on the glass above the flow orifice, a float in contact with the glass, a lever from which the float is suspended, two valves operated by the lever and controlling the variations in pressure, a valve seat arranged between the two valves, and means for adjusting said valve seat.

34. A glass feeder including a flow spout having a flow orifice, means for periodically varying the air pressure on the glass above the flow orifice, a float in contact with the glass, a lever from which the float is suspended, two valves operated by the lever and controlling the variations in pressure, a valve seat arranged between the two valves, means for adjusting the valve seat, and means for adjusting the distance between the valves.

35. A glass feeder including a flow spout having a flow orifice, means for periodically varying the air pressure on the glass above the flow orifice, a float in contact with the glass, a lever from which the float is suspended, a valve carried by the lever, a second valve adjustably connected to the first-mentioned valve, and means for adjusting said valves.

36. A glass feeder including a flow spout having a flow orifice, means for periodically varying the air pressure on the glass above the flow orifice, a float in contact with the glass, a lever from which the float is suspended, a valve carried by the lever, a second valve adjustably connected to the first-mentioned valve, and an air inlet member rotatable to adjust said valves.

37. A glass feeder including a flow spout having a flow orifice, means for periodically varying the air pressure on the glass above the flow orifice, a float in contact with the glass, a lever from which the float is suspended, a valve stem operated by said lever, two valves associated with the valve stem and adjustably connected together, an air inlet member having an angular interior, and said valve stem having an angular end portion arranged in the air inlet member, whereby the valves may be adjusted by the rotation of the inlet member.

THOMAS STENHOUSE.